UNITED STATES PATENT OFFICE.

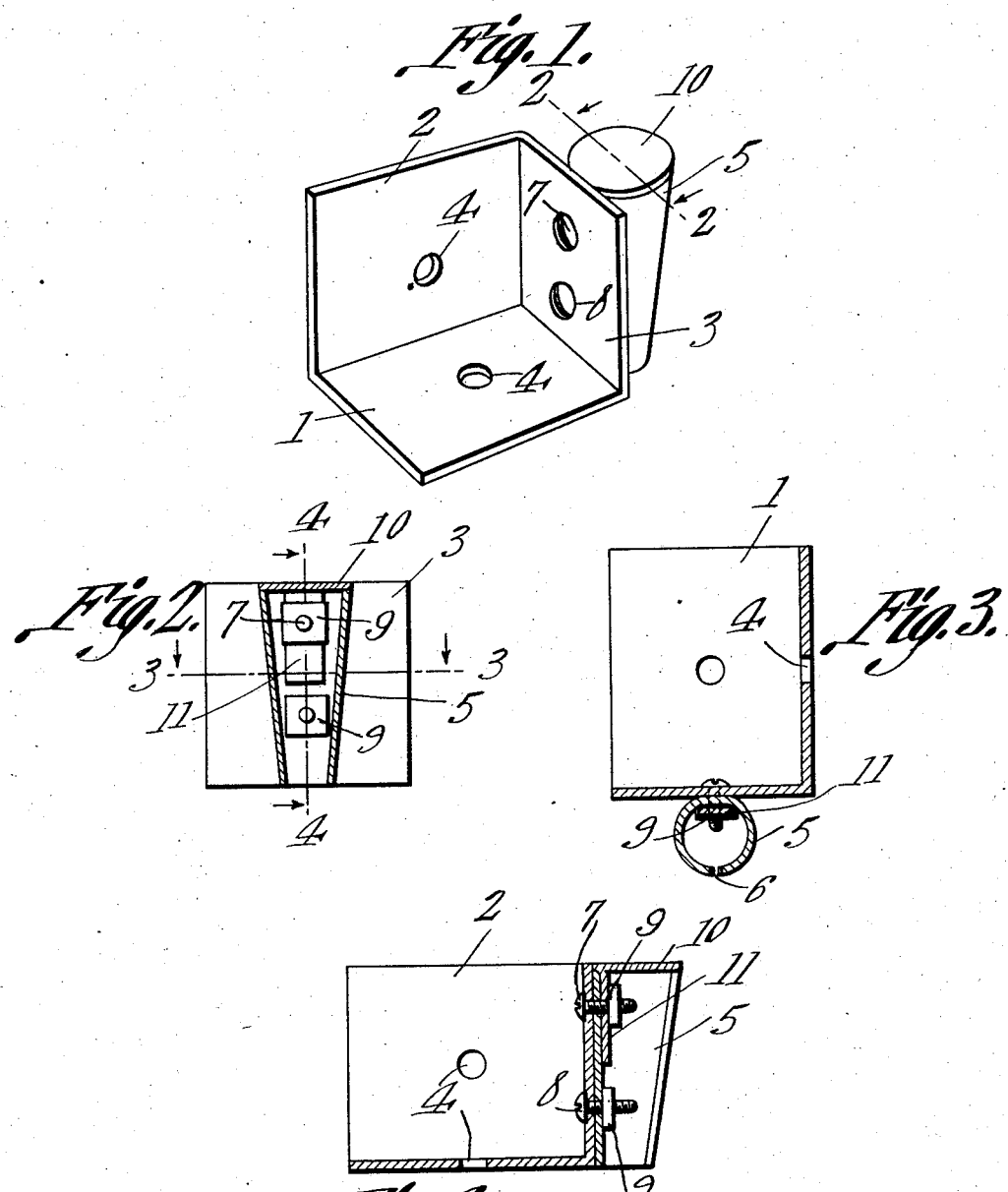

THOMAS MOSLEY, OF LAWTON, OKLAHOMA.

CORNER-FASTENING FOR BEDSTEADS.

1,010,943.     Specification of Letters Patent.     Patented Dec. 5, 1911.

Application filed April 19, 1911. Serial No. 622,095.

*To all whom it may concern:*

Be it known that I, THOMAS MOSLEY, a citizen of the United States, residing at Lawton, in the county of Comanche and State of Oklahoma, have invented a new and useful Corner-Fastening for Bedsteads, of which the following is a specification.

The device forming the subject matter of this application, is adapted to be assembled with one element of a bedstead structure, to effect a removable union between such element and another element.

Specifically, it is the object of the present invention to provide a tenon of novel and improved form, carried by a supporting structure, and adapted to be adjusted with respect to such supporting structure, so as to conform to mortises, differing slightly from the shape of the tenon.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in perspective; Fig. 2 is a section on the line 2—2 of Fig. 1; Fig. 3 is a section on the line 3—3 of Fig. 2; and Fig. 4 is a section on the line 4—4 of Fig. 2.

In carrying out the invention there is provided, as a primary element, a supporting structure, the same preferably consisting of an angle member, the angle member ordinarily being of rigid, one-piece construction, and comprising rectangularly disposed flanges 1, 2 and 3. These flanges are equipped with suitable openings 4, adapted to receive securing elements, whereby the angle member may be connected with the side rail of a bedstead.

The tenon, denoted generally in Fig. 1 by the numeral 5, is fashioned from a single piece of resilient sheet metal, disposed in conical form, and having its edges in alinement, so as not to break the contour of the cone, the edges being spaced apart slightly, as shown at 6, to provide for a springing of the tenon, to accommodate mortises of different contours.

The tenon 5 is assembled with the flange 3 by means of a pair of securing elements. These securing elements preferably consist of bolts 7 and 8, having kerfed heads, the bolts 7 and 8 carrying nuts 9. The bolts 7 and 8 pass through the flange 3, and engage with the tenon 5 at a point diametrically opposite from the spaced edges 6, as the drawings clearly show.

The invention further includes a closure, in the form of a flat disk, denoted by the numeral 10, and adapted to rest upon the broader, upper end of the cone shaped tenon 5. This closure 10 is supplied with an angularly disposed tongue 11, extended downwardly within the contour of the tenon, adjacent the flange 3, the upper securing element 7 passing through the tongue 11 and serving to hold the closure in place.

It will be seen that by loosening one or both of the nuts 9, the tenon 5 may be permitted to swing away from the flange 3, to a greater or less extent, the tenon 5 being thereby permitted to enter, and to register properly in, mortises of any contour likely to be encountered. Moreover, since the edges of the tenon are spaced apart, as shown at 6, the tenon will be given a slight springing action, so as to conform properly to the mortise into which it may be entered.

It will be understood, of course, that by employing a pair of securing elements 7—8, not only will the tenon 5 be supported upon the angle member, but at the same time, the tenon will be prevented from rotating upon the supporting member.

Having thus described the invention what is claimed is:—

1. In a device of the class described, a supporting structure; a tenon fashioned from a single piece of spring material disposed in conical form, and having edges disposed in alinement, but spaced slightly apart, to provide for a springing of the tenon; and spaced securing elements adjustably uniting the tenon with the supporting structure, whereby either end of the tenon, separately, may be tilted with respect to the supporting structure, thereby to permit the tenon to coöperate properly with the mortise which the tenon is adapted to enter.

2. In a device of the class described, a supporting structure; a tenon fashioned from a single piece of spring material, disposed in conical form, and having its edges disposed in alinement, but spaced slightly apart, to provide for a springing of the tenon; and spaced securing elements adjustably uniting the tenon with the supporting structure, whereby the tenon may be tilted with respect to the supporting structure, thereby to conform to the mortise which the tenon is adapted to enter; and a closure for the upper end of the tenon, the closure having an angularly disposed tongue, which is engaged with one of the securing elements, upon the interior of the tenon.

In testimony that I claim the foregoing as my own, I have hereto affixed my signature in the presence of two witnesses.

THOMAS MOSLEY.

Witnesses:
L. H. WELLS,
A. J. BURTON.

Copies of this patent may be obtained for five cents each, by addressing the "Commissioner of Patents, Washington, D. C."